United States Patent
Sutardja

(10) Patent No.: US 8,046,629 B1
(45) Date of Patent: *Oct. 25, 2011

(54) FILE SERVER FOR REDUNDANT ARRAY OF INDEPENDENT DISKS (RAID) SYSTEM

(75) Inventor: Pantas Sutardja, Los Gatos, CA (US)

(73) Assignee: Marvell World Trade Ltd., St. Michael (BB)

( * ) Notice: Subject to any disclaimer, the term of this patent is extended or adjusted under 35 U.S.C. 154(b) by 432 days.

This patent is subject to a terminal disclaimer.

(21) Appl. No.: 11/724,549

(22) Filed: Mar. 15, 2007

Related U.S. Application Data

(63) Continuation of application No. 11/591,325, filed on Nov. 1, 2006.

(60) Provisional application No. 60/820,180, filed on Jul. 24, 2006.

(51) Int. Cl.
*G06F 11/00* (2006.01)

(52) U.S. Cl. ............ 714/6.22; 714/6.1; 714/6.2; 714/42

(58) Field of Classification Search ............ 707/10; 711/114; 714/1–57, 770, 6.1, 6.11, 6.2, 6.21, 714/6.22, 6.24, 42; 379/133; 370/429, 422, 370/428, 351, 389–390
See application file for complete search history.

(56) References Cited

U.S. PATENT DOCUMENTS

| | | | |
|---|---|---|---|
| 4,989,206 A | 1/1991 | Dunphy | |
| 5,469,453 A | 11/1995 | Glider et al. | |
| 6,243,824 B1 | 6/2001 | Kakuta et al. | |
| 6,526,477 B1 | 2/2003 | Yuan et al. | |
| 7,000,143 B2 * | 2/2006 | Moulton et al. | 714/6 |
| 7,234,074 B2 * | 6/2007 | Cohn et al. | 714/6 |
| 7,251,249 B2 * | 7/2007 | Nanduri et al. | 370/429 |
| 7,302,603 B2 * | 11/2007 | Nielsen et al. | 714/6 |
| 7,565,598 B2 | 7/2009 | Pashenkov et al. | |
| 7,730,346 B2 | 6/2010 | Kroesche et al. | |
| 7,797,609 B2 | 9/2010 | Neuman | |
| 2004/0250019 A1 | 12/2004 | Fujie | |
| 2005/0015694 A1 | 1/2005 | Hetzler et al. | |
| 2005/0022052 A1 | 1/2005 | Moulton et al. | |

(Continued)

FOREIGN PATENT DOCUMENTS

EP    A 0 730 229    9/1996

OTHER PUBLICATIONS

Notification of Transmittal of The International Search Report and The Written Opinion of The International Searching Authority, or The Declaration dated Apr. 21, 2009 in reference to PCT/US2007/016159.

Microsoft Computer Dictionary, Microsoft Press, 4th Ed., 1999, p. 429.

*Primary Examiner* — Scott Baderman
*Assistant Examiner* — Sarai Butler

(57) ABSTRACT

A redundant array of independent disks (RAID) system comprises N storage arrays, wherein each of the N storage arrays comprise a target processing module and 1 to M hard disk drives, where M and N are integers greater than 1. A data processing module selectively assigns error checking and correcting (ECC) processing for data blocks to selected ones of the target processing modules in a non-overlapping manner. A switch module provides communication paths between the data processing module and the N storage arrays and between each one of the N storage arrays and others of the N storage arrays.

48 Claims, 11 Drawing Sheets

U.S. PATENT DOCUMENTS

| | | |
|---|---|---|
| 2005/0223272 A1 | 10/2005 | Yasuhara |
| 2006/0106898 A1 | 5/2006 | Frondozo et al. |
| 2006/0123193 A1 | 6/2006 | Nakamura |
| 2006/0242396 A1* | 10/2006 | Cartes et al. ............ 713/1 |
| 2007/0050695 A1* | 3/2007 | Schulz ............ 714/752 |
| 2008/0016416 A1 | 1/2008 | Hetzler et al. |
| 2008/0256183 A1 | 10/2008 | Flynn et al. |
| 2010/0106906 A1 | 4/2010 | Galloway et al. |

* cited by examiner

FILE SERVER FOR REDUNDANT ARRAY OF INDEPENDENT DISKS (RAID) SYSTEM

CROSS-REFERENCE TO RELATED APPLICATIONS

This application is a continuation of U.S. Ser. No. 11/591,325, filed on Nov. 1, 2006, and claims the benefit of U.S. Provisional Application No. 60/820,180, filed on Jul. 24, 2006. The disclosures of the above applications are incorporated herein by reference in their entirety.

FIELD

The present disclosure relates to redundant arrays of independent disks (RAID) systems.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A redundant array of independent disks (RAID) system redundantly stores data on multiple hard disks. In some RAID levels, data blocks are split and stored on different disks, which reduces data storage and retrieval latency. Multiple disks also tend to increase mean time between failures (MTBF) and increases fault tolerance.

The RAID system appears to an accessing or host device as a single logical hard disk drive. The RAID system may employ disk striping, which involves partitioning the storage space of each drive into units. The size of the units will vary depending upon the application from a sector (512 bytes) up to several megabytes. The stripes of all the disks are typically interleaved and addressed in order.

There are many types of RAID systems in addition to a non-redundant array (RAID-0). In RAID-0, striping is employed without redundancy of data. It offers the best performance but no fault-tolerance. In RAID-1, disk mirroring is used without striping and at least two drives are required to allow duplication during storage of data. Read performance is improved since either disk can be read at the same time. Write performance is the same as single disk storage. RAID-1 provides the best performance and the best fault-tolerance in a multi-user system.

In RAID-2, striping across disks is used. Some disks store error checking and correcting (ECC) information. In RAID-3, striping is used and one drive is dedicated to storing parity information. The embedded error checking (ECC) information is used to detect errors. Data recovery is accomplished by calculating the exclusive OR (XOR) of the information recorded on the other drives. Since an I/O operation addresses all drives at the same time, RAID-3 cannot overlap I/O. As a result, RAID-3 is best for single-user systems with long record applications.

In RAID-4, large stripes are used. Records can be read from any single drive. This allows overlapped I/O for read operations. Since write operations update the parity drive, no I/O overlapping is possible. In RAID-5, a rotating parity array is used, which addresses write limitations of RAID-4. Thus, read and write operations can be overlapped. RAID-5 stores parity information but does not use redundant data. However, the parity information can be used to reconstruct data. RAID-5 requires at least three and usually five disks for the array. RAID-5 is best for multi-user systems in which performance is not critical or which do few write operations.

RAID-6 is similar to RAID-5 except that a second parity scheme that is distributed across different drives is used. RAID-6 offers high fault- and drive-failure tolerance. In RAID-7, a real-time embedded operating system and controller are used. RAID-7 uses caching via a high-speed bus and other characteristics of a stand-alone computer.

RAID-10 combines RAID-0 and RAID-1. There are two subtypes: In RAID-0+1, data is organized as stripes across multiple disks, and then the striped disk sets are mirrored; and in RAID-1+0, the data is mirrored and the mirrors are striped.

In RAID-50 (or RAID-5+0), a series of RAID-5 groups are used. The groups are striped in RAID-0 fashion to improve RAID-5 performance without reducing data protection. In RAID-53 (or RAID-5+3), striping (in RAID-0 style) is used for RAID-3's virtual disk blocks. This offers higher performance than RAID-3 but at much higher cost.

When the host device sends a data block for storage, RAID processing is performed for the selected RAID approach. The RAID processing may include redundancy and recovery processing (such as error checking and correcting (ECC)) for the selected RAID level and/or other processing.

In one approach, a single central processing unit (CPU) receives data blocks from another device. The CPU handles all of the RAID processing including ECC. With this approach, the CPU can often rate-limit data storage since processing relating to ECC can be variable and time consuming. In other words, processing in the CPU may cause a bottleneck and increase latency. With a single CPU, the RAID construction for one data block needs to be completed before a subsequent data block can be processed.

SUMMARY

A redundant array of independent disks (RAID) system comprises N storage arrays, wherein each of the N storage arrays comprise a target processing module and 1 to M hard disk drives, where M and N are integers greater than 1. A data processing module assigns a first data storage request for a first data block to one of the target processing modules for processing of error checking and correcting (ECC) data for the first data block. The one of the target processing modules sends a first portion of the first data block and ECC data associated with the first data block to another of the target processing modules.

In other features, the ECC data received by the another of the target processing modules corresponds to the first portion. An interface that receives the first data block and that forwards the first data block to the data processing module. The interface comprises at least one of a network interface, a Gigabit Ethernet network interface and a data bus. A switch module switches data between the data processing module and the N storage arrays and between the N storage arrays. The switch module comprises a multi-port high speed switch. The data processing module assigns a second data storage request for a second data block to a second target processing module for processing of ECC data for the second data block, wherein the second target processing module sends a first portion of the second data block and ECC data associated with the second data block to a third one of the target processing modules. The first and second data blocks are processed in an overlapping manner in the one of the target processing modules and the second target processing modules, respectively.

In other features, the data processing module comprises an interface, memory, and at least one processor. The data processing module performs file system (FS) protocol functions on the first data block. The FS protocol comprises at least one of Network File Server (NFS) and Common Internet File Server (CIFS). The data processing module determines a level of RAID storage to be applied to the first data block. The data processing module maps the first data block to selected ones of the N storage arrays and updates a storage map for the N storage arrays.

In other features, when the data processing module receives a data retrieval request, the data processing module assigns the data retrieval request to a first one of the target processing modules. The first one of the target processing modules retrieves data corresponding to the data retrieval request from others of the target processing modules and ECC data relating to portions of the data having errors.

In other features, the first one of the target processing modules performs data recovery on the portions using the ECC data. When the data processing module receives a data retrieval request, the data processing module sends data retrieval messages to the target processing modules having data corresponding to the data retrieval request. The target processing modules retrieve the data corresponding to the data retrieval request and ECC data relating to portions of the data having errors. The target processing modules send the retrieved data corresponding to the data retrieval request and the ECC data to the data processing module, and wherein the data processing module performs data recovery on the portions using the ECC data. The target processing modules perform data recovery on the portions using the ECC data.

A redundant array of independent disks (RAID) system comprises N storage arrays, wherein each of the N storage arrays comprise a target processing module and 1 to M hard disk drives, where M and N are integers greater than 1. A data processing module selectively assigns error checking and correcting (ECC) processing for data blocks to selected ones of the target processing modules in a non-overlapping manner. A switch module provides communication paths between the data processing module and the N storage arrays and between each one of the N storage arrays and others of the N storage arrays.

In other features, the data processing module assigns a data storage request for a first data block to one of the target processing modules for processing of ECC data for the first data block, and wherein the one of the target processing modules sends a first portion of the first data block and ECC data associated with the first data block to another of the target processing modules. The ECC data received by the another of the target processing modules corresponds to the first portion. An interface receives the data blocks and forwards the data blocks to the data processing module. The interface comprises at least one of a network interface, a Gigabit Ethernet network interface and a data bus.

In other features, the switch module comprises a multi-port high speed switch. The switch module includes a multi-port switch that operates at speeds greater than or equal to 1 Gigabit per second. The switch module includes a multi-port Gigabit Ethernet switch. The data processing module assigns a second data storage request for a second data block to a second target processing modules for processing of ECC data for the second data block. The second target processing module sends a first portion of the second data block and ECC data associated with the second data block to a third one of the target processing modules.

In other features, the first and second data blocks are processed in an overlapping manner in the one of the target processing modules and the second target processing modules, respectively. The data processing module comprises an interface, memory, and at least one processor, and wherein the data processing module performs file system (FS) protocol functions on the first data block. The FS protocol comprises at least one of Network File Server (NFS) and Common Internet File Server (CIFS). The data processing module determines a level of RAID storage to be applied to the data blocks. The data processing module maps the data blocks to selected ones of the N storage arrays and updates a storage map for the N storage arrays.

In other features, when the data processing module receives a data retrieval request, the data processing module assigns the data retrieval request to a first one of the target processing modules. The first one of the target processing modules requests data corresponding to the data retrieval request from others of the target processing modules and ECC data relating to portions of the data having errors. The first one of the target processing modules performs data recovery on the portions using the ECC data.

In other features, when the data processing module receives a data retrieval request, the data processing module sends data retrieval messages to the target processing modules having data corresponding to the data retrieval request. The target processing modules retrieve the data corresponding to the data retrieval request and ECC data relating to portions of the data having errors. The target processing modules send the retrieved data corresponding to the data retrieval request and the ECC data to the data processing module, and wherein the data processing module performs data recovery on the portions using the ECC data. The target processing modules perform data recovery on the portions using the ECC data.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
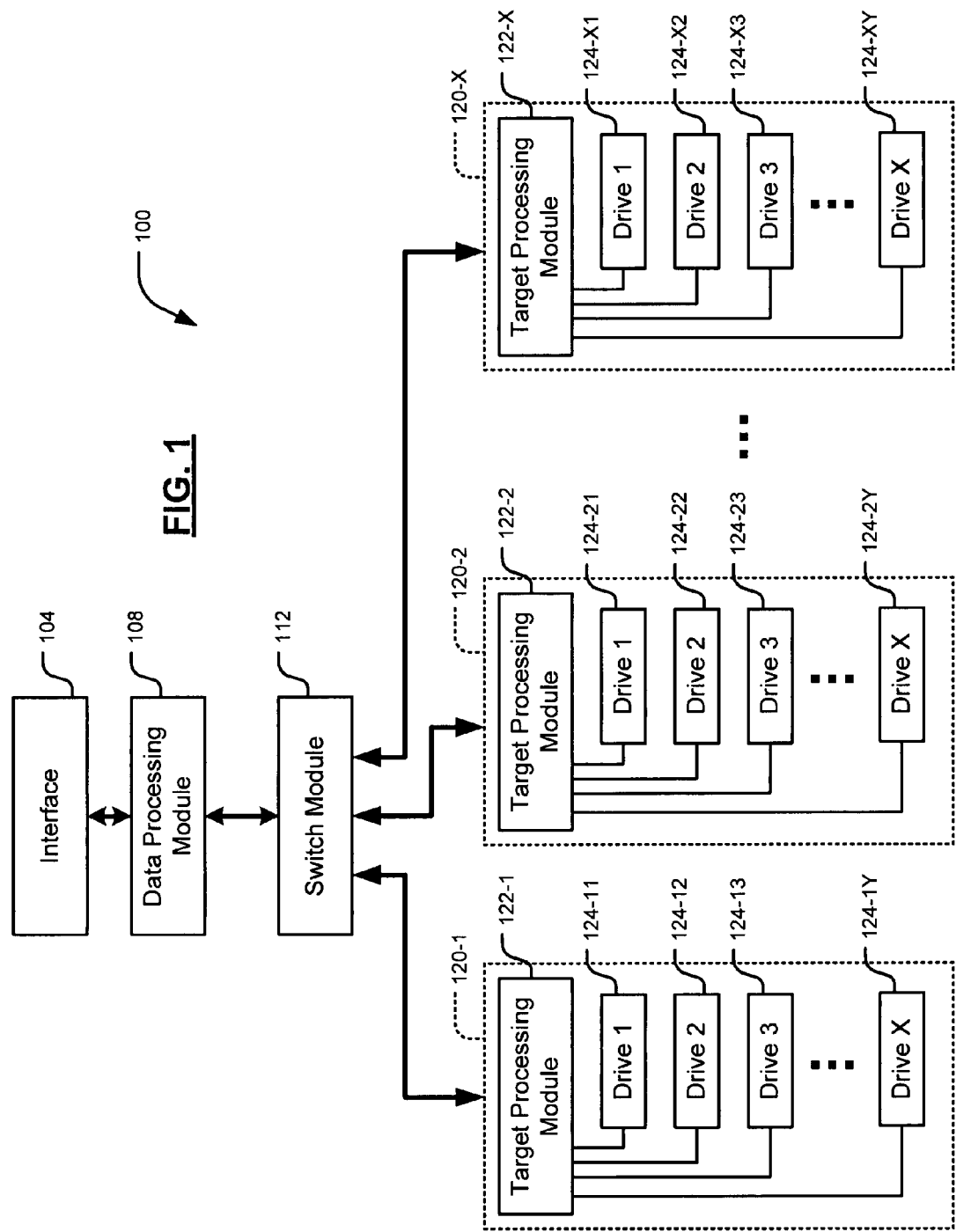
FIG. 1 is a functional block diagram of a RAID system according to the present disclosure.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Referring now to FIG. 1, a redundant array of independent disks (RAID) system 100 is shown. An interface 104 receives blocks of data for storage in the RAID system 100. For example, the interface 104 may be a high speed interface such as Gigabit Ethernet network interface, a data bus, etc., although any other type of interfaces may be used. A data processing module 108 performs part of the RAID processing. In other words, the data processing module 108 receives the data blocks from the interface 104 and performs operating system (OS) and file system (FS) protocol functions on the data. For example, the FS protocol may include Network File Server (NFS), Common Internet File Server (CIFS) and/or other suitable protocols. The data processing module 108 distributes redundancy and recovery processing (such as error checking and correcting (ECC)) to other target processing devices as will be described below.

The data processing module 108 communicates with a switch module 112. For example only, the switch module 112 may be a multi-port high speed switch such as a crossbar switch, a Gigabit switch or a Gigabit Ethernet switch. The switch module 112 may switch data organized as data packets. As can be appreciated, the switch module 112 provides scalability and flexibility as compared to hardwired connections.

The switch module 112, in turn, communicates with two or more storage arrays 120-1, 120-2, ..., and 120-X (collectively storage arrays 120), where X is an integer greater than 1. Each of the storage arrays 120 includes target processing modules 122-1, 122-2, ..., and 122-X, respectively, (collectively target processing modules 122) and one or more hard disk drives (HDDs) 124-11, 124-12, ..., and 124-XY, (collectively HDDs 124) where Y is an integer greater than zero. As can be appreciated, the number of storage arrays 120 and HDDs 124 in each storage array 120 may be varied to allow scaling.

Figure 2A:
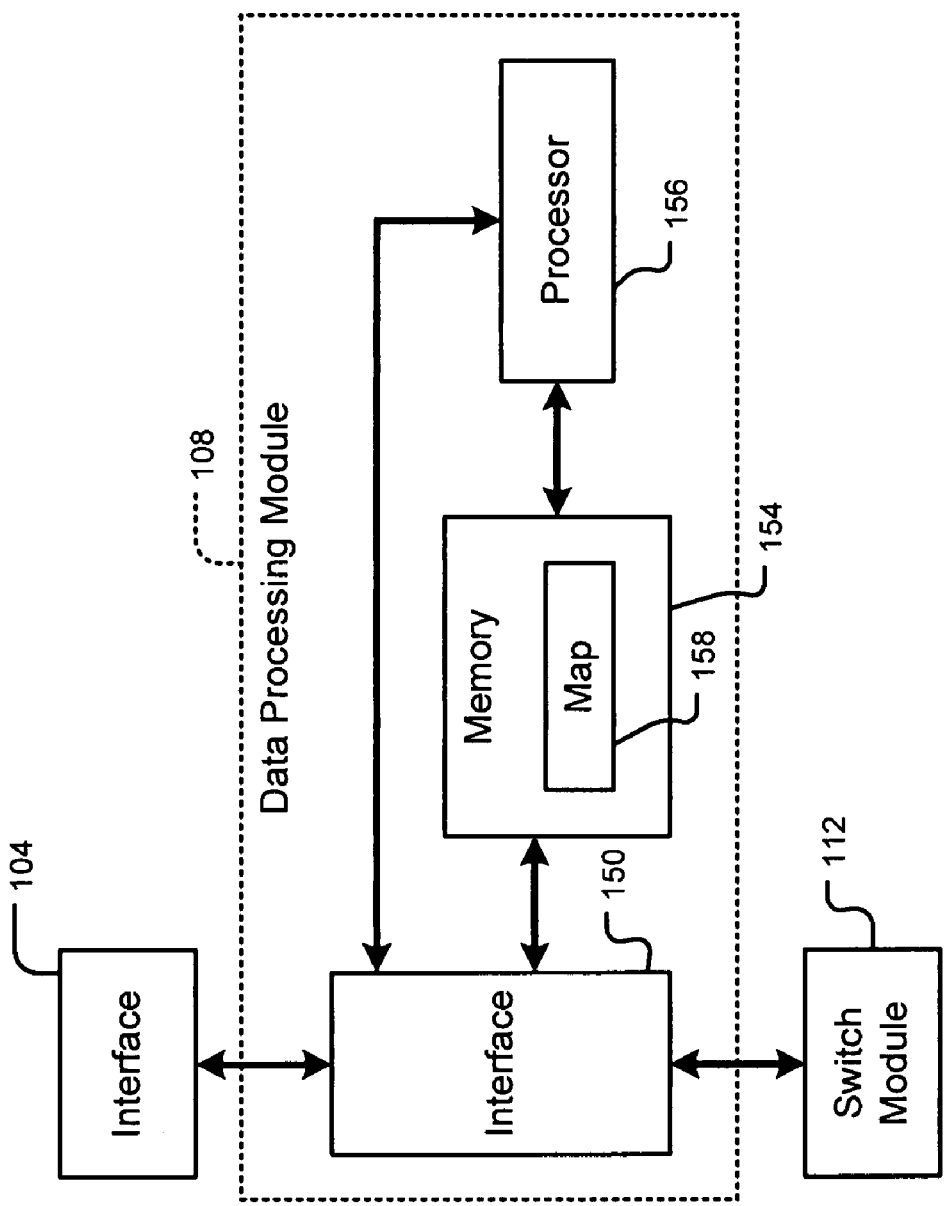
FIG. 2A is a functional block diagram of a data processing module.

Referring now to FIG. 2A, an exemplary data processing module 108 is shown in further detail. The data processing module 108 receives data blocks for data storage via the interface 104. The data processing module 108 may include an interface 150, memory 154, and one or more processors 156.

The data processing module 108 may determine a level of RAID storage to be applied, handle FS-related processing, may map the data blocks to the storage arrays, assign RAID redundancy and recovery processing (such as error checking and correcting (ECC)) to a selected target processing module, and may update a storage map, etc.

The target processing module 122 that is assigned to perform the RAID redundancy and recovery processing receives instructions from the data processing module 108. The selected target processing module 122 generates error checking and correcting (ECC) for the assigned data block. Upon completion, the target processing module 122 performs data spreading by selectively sending portions of the data block and/or ECC data to the other target processing modules for storage in the other arrays based on RAID instructions provided by the data processing module 108. Some data and ECC data may also be stored locally.

Concurrently, other target processing modules 122 can be assigned RAID redundancy and recovery processing for other data blocks. The other target processing modules 122 process ECC for other data blocks in an overlapping manner. Since the data processing module 108 does not handle ECC for any of the data blocks to be stored, the data processing module 108 no longer causes bottlenecks. The memory 154 associated with the data processing module 108 may store and update a global drive map 158 of data in the storage arrays 120.

Figure 2B:
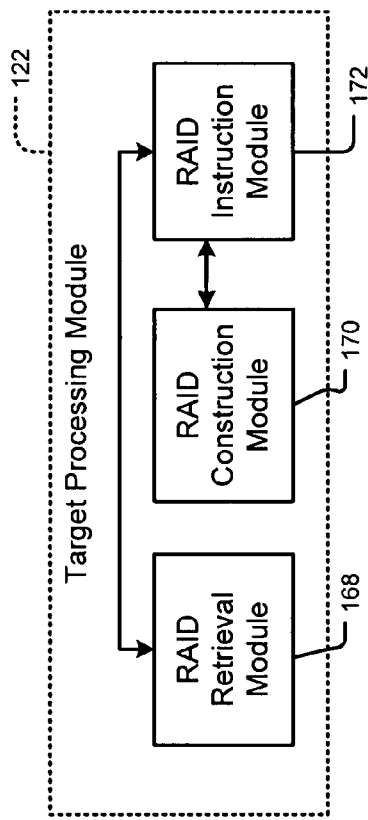
FIG. 2B is a functional block diagram of a target processing module.

Referring now to FIG. 2B, each of the target processing modules 122 may include a RAID construction module 168 and a RAID retrieval module 170. The RAID construction module 168 processes ECC. The RAID retrieval module 170 processes RAID retrieval requests as will be described below.

The RAID construction module 170 processes ECC for portions of the data block that are to be stored on local drives 124 associated with the selected target processing module 122. In addition, the RAID construction module 170 processes ECC for remote drives associated with remote storage arrays 120. A RAID instruction module 172 generates RAID instructions for other target processing and may handle RAID instructions received from other target processing modules 122. The RAID instruction module 172 may be integrated with the RAID construction module 170.

The remote storage arrays 120 associated with target processing modules other than the selected target processing module store the data and/or ECC data received from the selected target processing module. The remote storage arrays 120 may simply follow the RAID instructions sent by the selected target processing module 122.

As can be appreciated, the amount of processing performed by the remote storage arrays 120 is significantly lower than the RAID construction processing performed by the target processing module 122. This allows the target processing modules 122 of the remote storage arrays 120 to be available to process RAID construction for other data blocks in an overlapping manner.

Figure 2C:
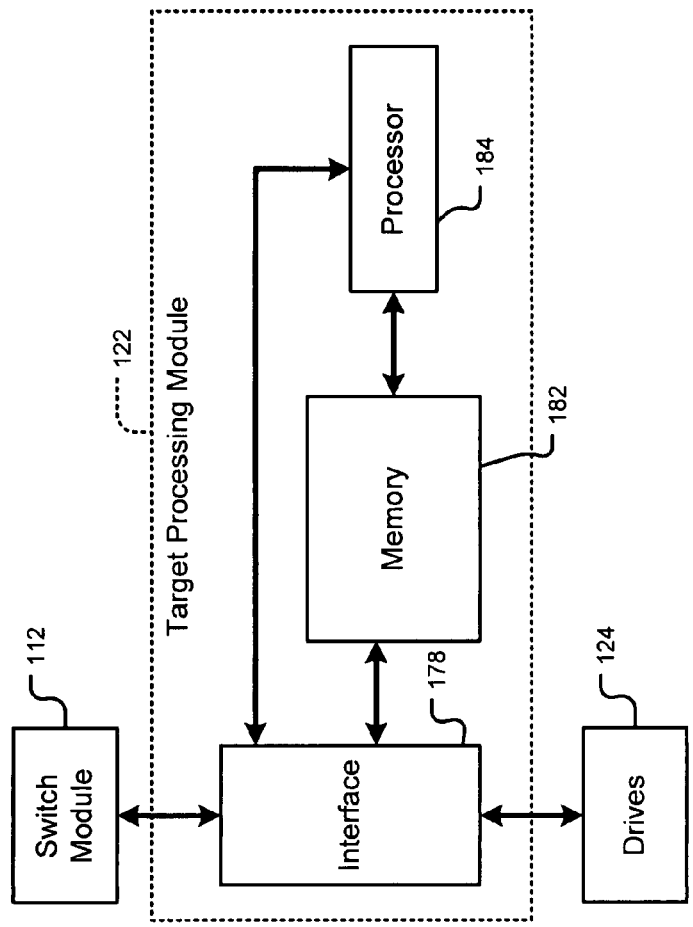
FIG. 2C is a more detailed functional block diagram of an exemplary target processing module.

Referring now to FIG. 2C, an exemplary target processing module 122 is shown in further detail. The target processing module 122 receives requests to perform RAID construction from the data processing module and/or RAID instructions sent by remote target processing modules via the switch module 112. The target processing module 122 includes an interface 178, memory 182 and one or more processors 184.

Figure 3:
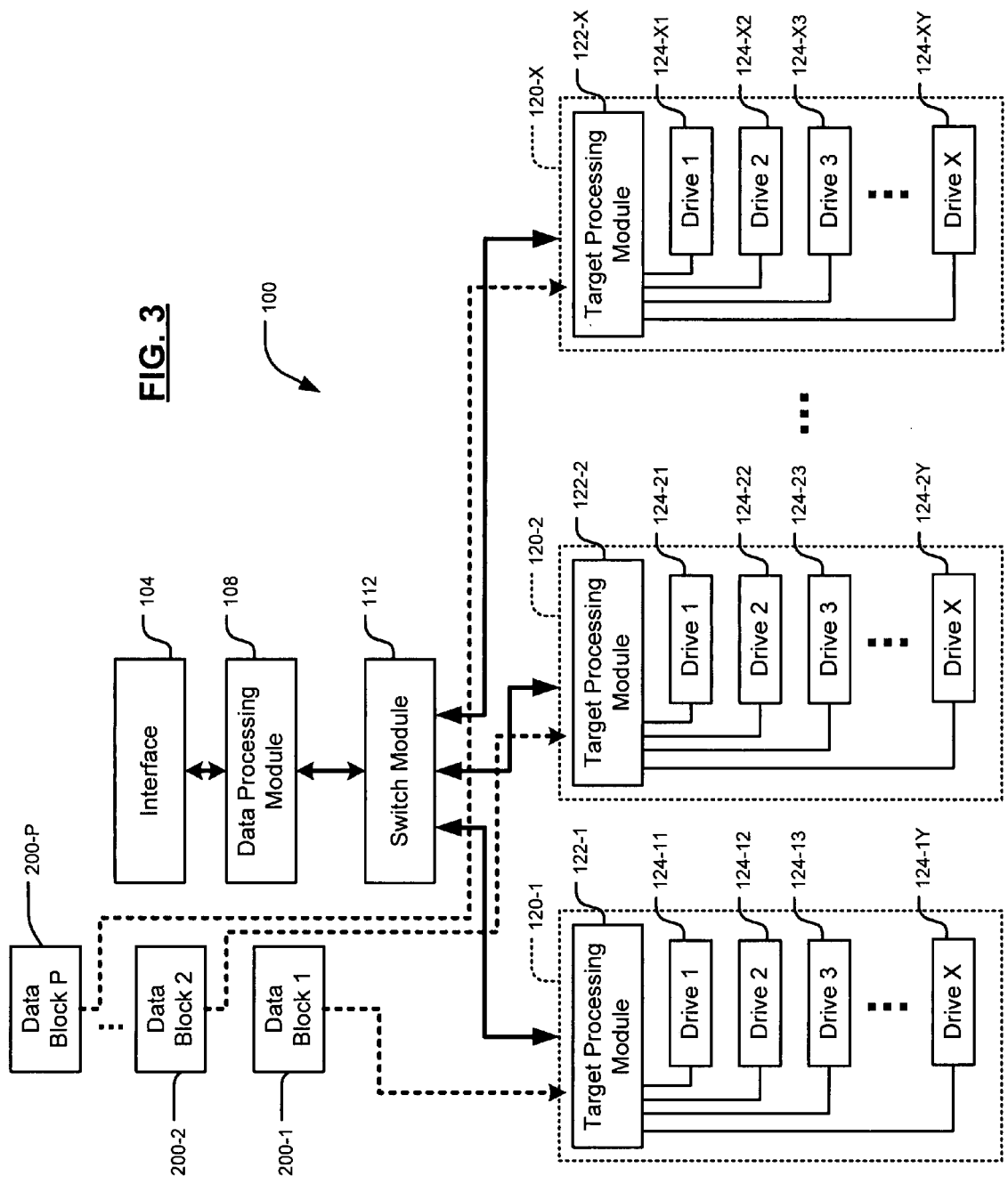
FIG. 3 is a functional block diagram illustrating processing of data blocks.

Referring now to FIG. 3, in use a first data block 200-1 is received via the interface 104 at the data processing module 108. The data processing module 108 performs OS and FS protocol functions on the data block. The data processing module 108 assigns the data block to a target processing module 122 associated with one of the storage arrays 120. Additionally, the data processing module 122 may determine a level of RAID storage to be applied, may map the data blocks to the storage arrays, may update a storage map, etc.

For example, the first data block 200-1 may be assigned to the target processing module 122-1 of the first storage array 120-1. The selected target processing module 122-1 generates ECC for the data block. While storage array 120-1 is generating ECC for the first data block, the data processing module 108 receives a second data block 200-2 via the interface 104. The data processing module 108 assigns the second data block to the target processing module 122-2 associated with the storage array 120-2 for ECC generation.

Overlapping the handling of RAID construction processing for data blocks can continue for additional data blocks 200-P until all of the target processing modules are handling data blocks. As a result, throughput may be significantly increased as compared to other approaches.

Figure 4:
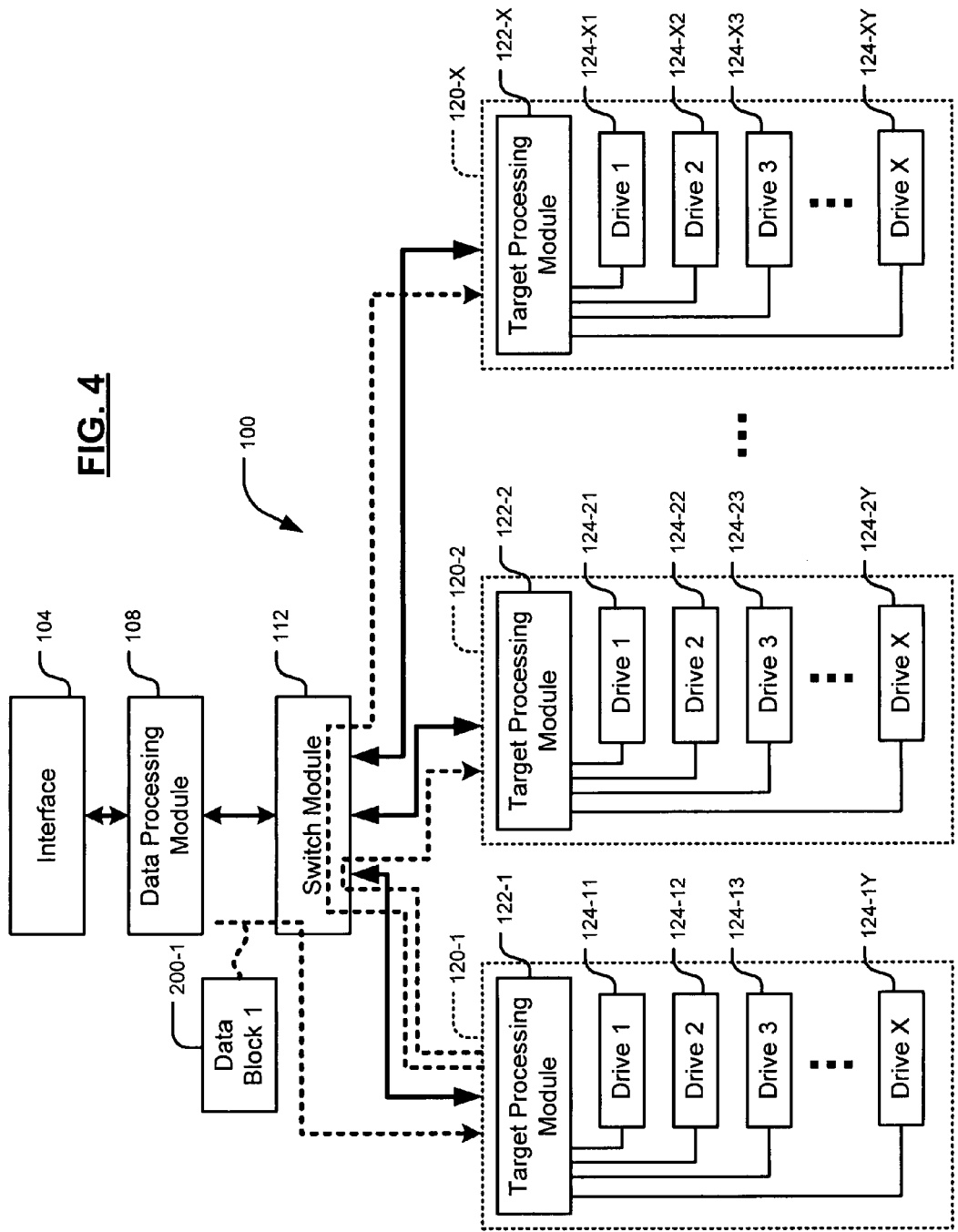
FIG. 4 is a functional block diagram illustrating processing of data blocks.
Figure 5:
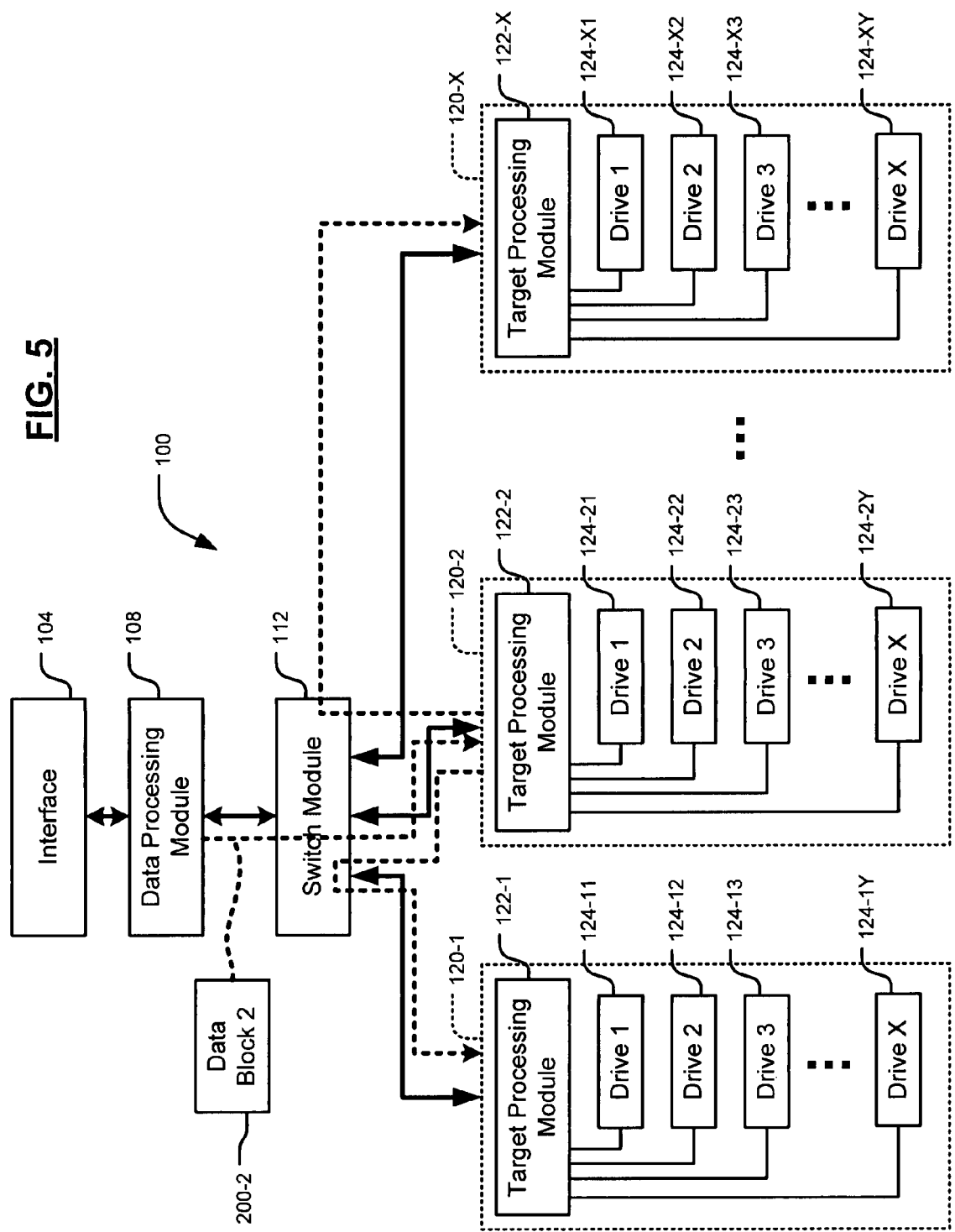
FIG. 5 is a functional block diagram illustrating processing of data blocks.

Referring now to FIGS. 4 and 5, processing of the data block 200-1 is shown in further detail. After processing, the data processing module 108 sends the data block 200-1 to the target processing module 122-1 of the storage array 120-1. The data processing module 108 may also update the drive map. The target processing module 122-1 processes ECC for the data block. The target processing module 122-1 may store some of the data associated with the data block 200-1 on the local drives 124 associated with the storage array 120-1. In addition, the target processing module 122-1 may send RAID instructions, data and/or ECC data to target processing modules 122-2, . . . , and 122-X associated with other storage arrays. The other target processing modules 122-2, . . . , and 122-X in the remote storage arrays 120-2, . . . , and 120-X simply follow the RAID instructions and have limited processing burden, which leaves these target processing modules 122-2, . . . , and 122-X of the remote storage arrays 120-2, . . . , and 120-X free to handle ECC for other data blocks.

In FIG. 5, the data processing module 108 receives a second data block 200-2 while the target processing module 122-1 is processing ECC for the first data block 200-1. The data processing module 108 assigns the second data block 200-2 to the target processing module 122-2 associated with the storage array 120-2. Additional data blocks 200-P can be assigned to target processing modules 122 of other storage arrays 120.

Figure 6:
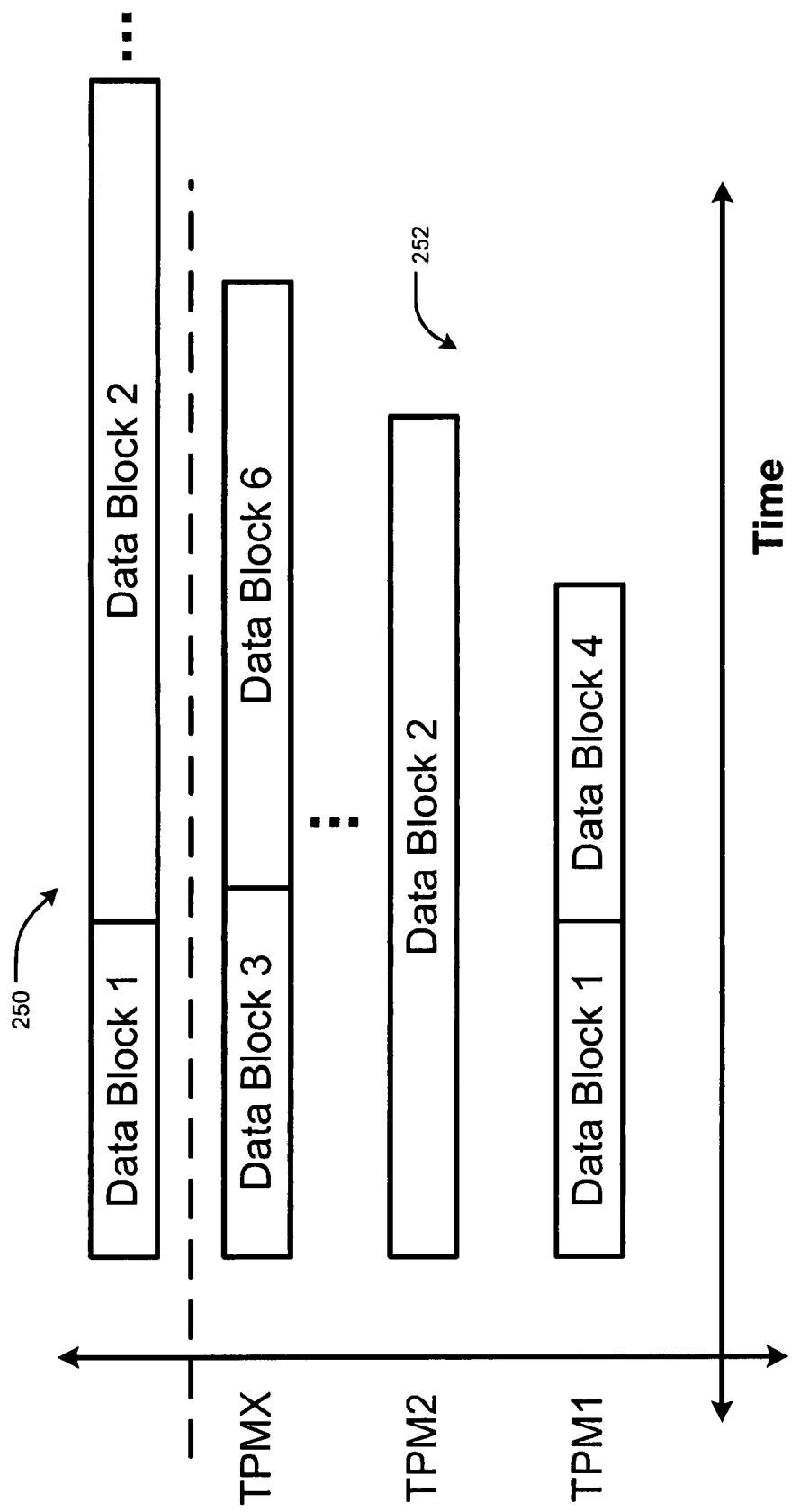
FIG. 6 illustrates timing of processing of data blocks.

Referring now to FIG. 6, exemplary RAID processing of data blocks is shown generally at 250. This type of RAID processing can encounter bottlenecks, which reduces data access and retrieval times. Data processing according to some implementations of the present disclosure is shown at 252. RAID construction for the data blocks may take a variable amount of time. The RAID system according to the present disclosure can continue to handle data blocks even when one of the storage requests is taking a significantly longer amount of time to process.

Figure 7:
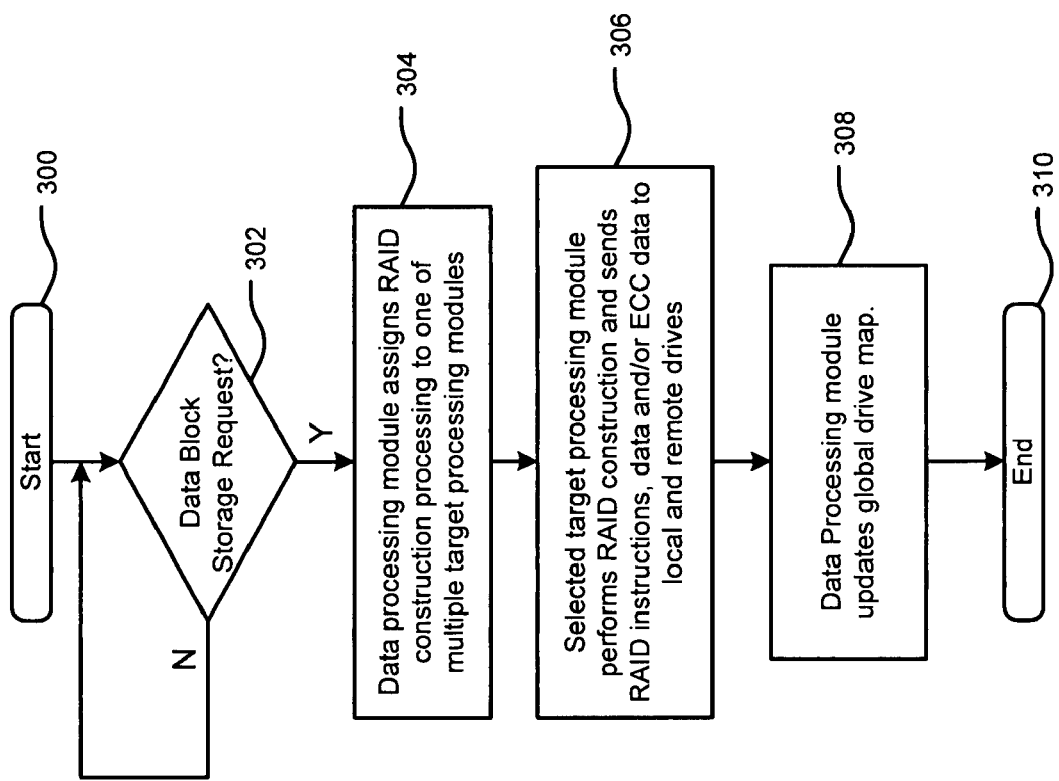
FIG. 7 is a flowchart illustrating a method for processing data blocks for storage.

Referring now to FIG. 7, a method for operating the RAID system during a data storage request is shown. Control begins with step 300. In step 302, control determines whether a data block for storage is received at the data processing module 108. If step 302 is true, the data processing module 108 assigns the ECC processing for the data block to one of multiple target processing modules 122 in step 304. The data processing module 108 may also update the global drive map and may perform other functions described above. In step 306, the selected target processing module processes the ECC for the data block. The selected target processing module may send RAID instructions, data and/or ECC data to remote target processing modules associated with remote storage arrays. Control ends with step 310.

Referring now to FIGS. 8A-10, various exemplary methods for data retrieval are illustrated. For data retrieval, ECC processing may be performed when errors are detected upon retrieval. The errors may be detected by the hard disk drive storing a sub-block associated with the error. Once detected, the ECC recovery can be performed locally by the same target processing modules, by a selected one of the target processing modules and/or by the data processing module.

Figure 8B:
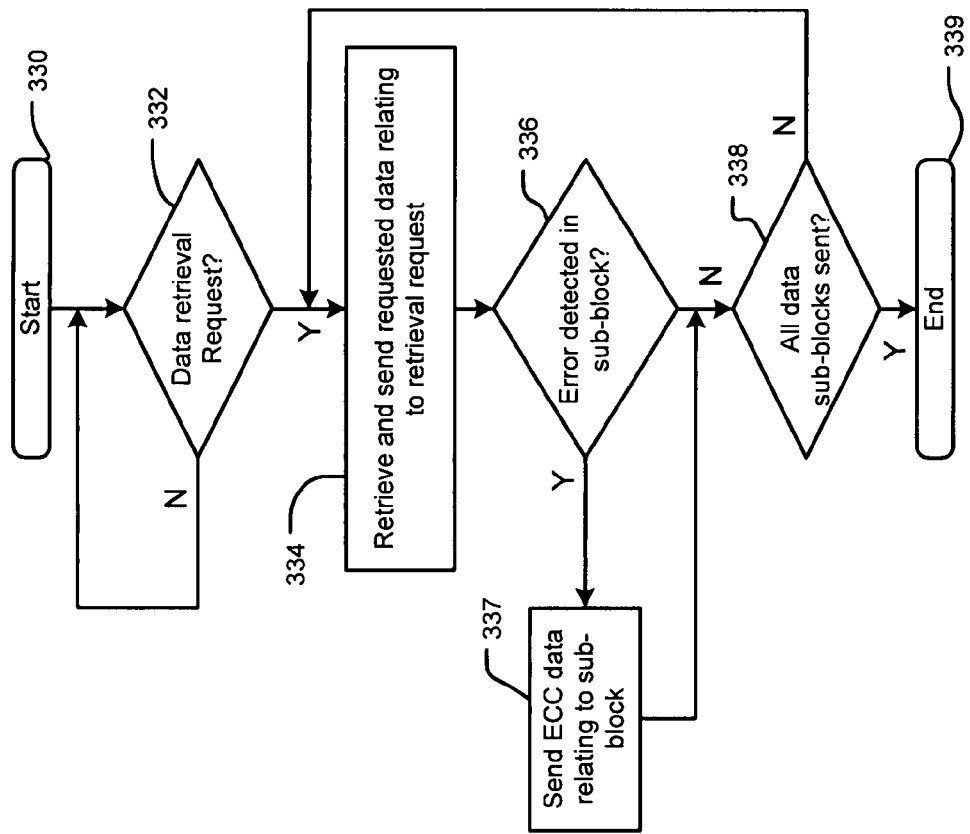
FIGS. 8A and 8B are flowcharts illustrating exemplary methods for retrieving data blocks with ECC processing performed by the data processing module.
Figure 8A:
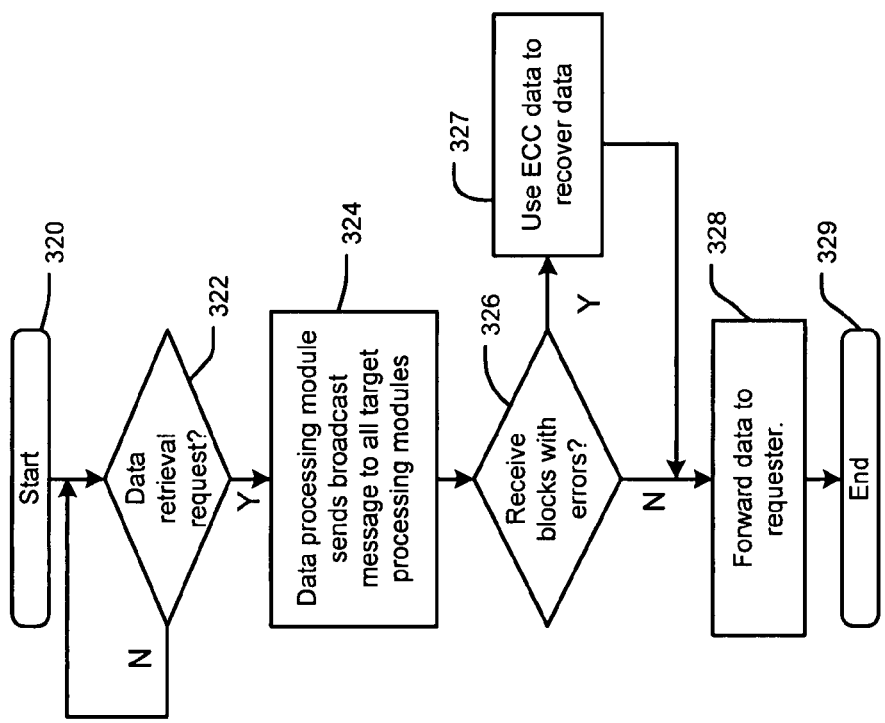

In FIGS. 8A and 8B, flowcharts illustrating exemplary methods for retrieving data blocks are shown. In this implementation, the ECC processing for data having ECC errors is performed by the data processing module. In FIG. 8A, control begins step 320 and proceeds to step 322 where the data processing module determines whether a data retrieval request has been received. If step 322 is true, the data processing module sends a broadcast message to all of the target processing modules having data associated with the data retrieval request in step 324. Alternately, the data processing module can use the map and send individual messages to each of the target processing modules individually.

In step 326, the data processing module determines whether it has received data blocks from the target processing modules with errors (and corresponding ECC data for the data with errors). If step 326 is true, the data processing module uses the ECC data to recover the data. Steps 326 and 327 continue with step 328 where the data processing module sends the corrected data to the requester. If the errors cannot be corrected, the data processing module may send an error message and/or retry retrieval. Control ends in step 329.

In FIG. 8B, control begins with step 330 and proceeds to step 332. In step 332, the target processing module determines whether it has received a data retrieval request from the data processing module. In step 334, the target processing module retrieves and sends data relating to the retrieval request to the data processing module. In step 336, the target processing module determines whether there are errors detected in a sub-block. If step 336 is true, the target processing module sends the ECC data relating to the sub-block to the data processing module. Steps 336 and 337 continue with step 338 where control determines whether all of the data has been sent relating to the data retrieval request. If not, control returns to step 334. If step 338 is true, control ends with step 339.

Figure 9B:
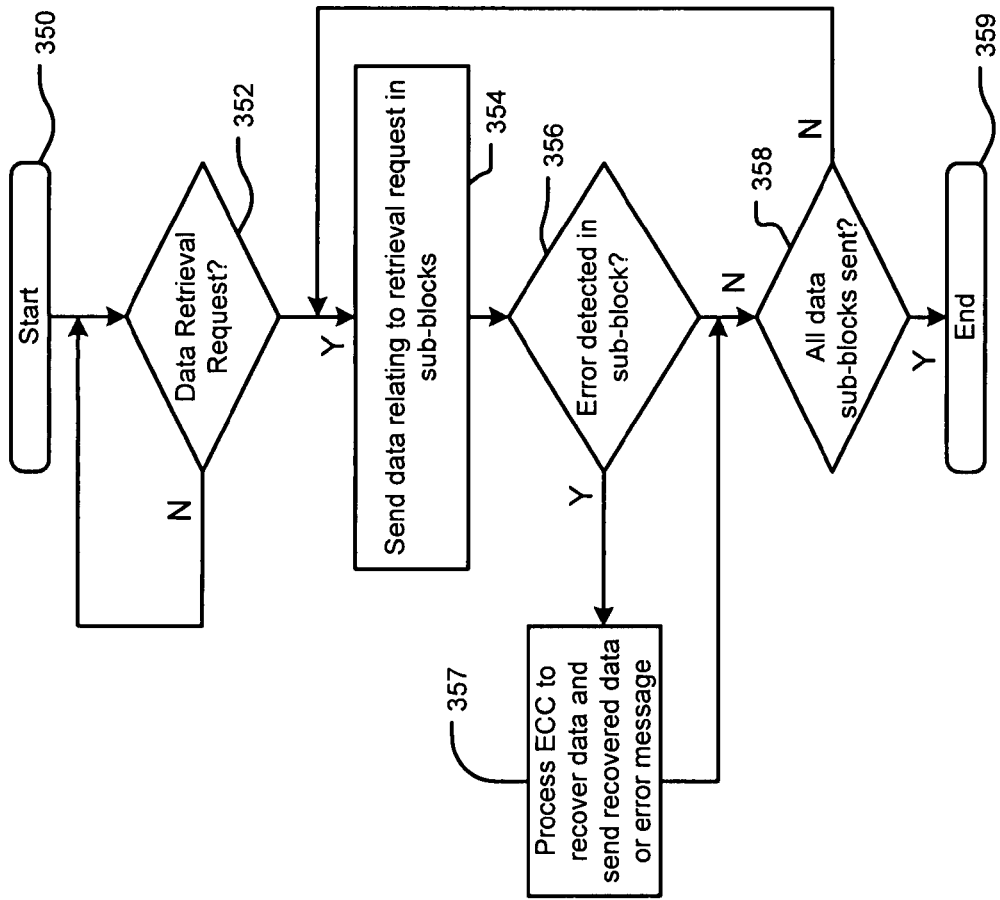
FIGS. 9A and 9B are flowcharts illustrating exemplary methods for retrieving data blocks with ECC processing performed by a respective ones of the target processing modules.
Figure 9A:
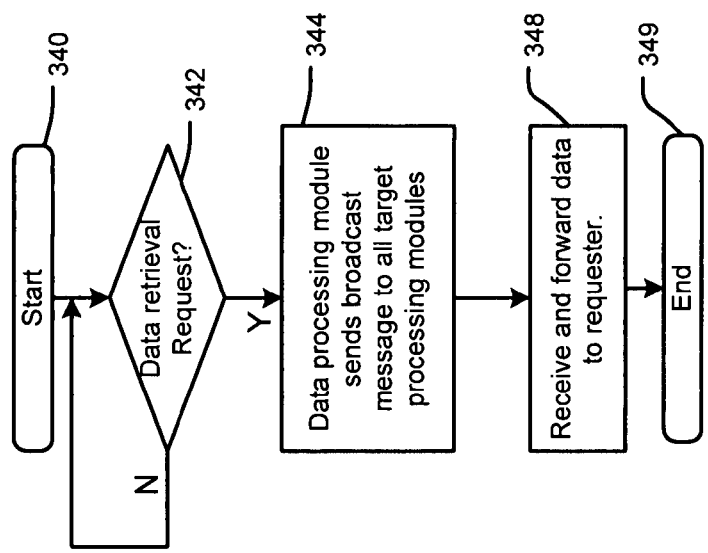

In FIGS. 9A and 9B, flowcharts illustrating exemplary methods for retrieving data blocks are shown. In this implementation, the ECC processing is performed by respective ones of the target processing modules that store the data. In FIG. 9A, control begins with step 340. In step 342, the data processing module determines whether it has received a data retrieval request. If step 342 is true, the data processing module sends a broadcast message to all of the target processing modules in step 334. Alternately, the data processing module may send individual messages to the target processing modules based on the map. In step 348, the data processing module receives and forwards the data to the requester. Control ends with step 349.

In FIG. 9B, control begins with step 350. In step 352, the target processing module determines whether it has received a data retrieval request. If step 352 is true, the target processing module sends the data relating to the retrieval request in sub-blocks to the data processing module in step 354. In step 356, control determines whether errors have been detected in the sub-blocks. If step 356 is true, control continues with step 357 and processes the ECC to recover data and sends the recovered data. If the data cannot be recovered, an error message may be sent and/or retry performed. Control continues from steps 356 and 357 with step 358. In step 358, control determines whether all of the sub-blocks associated with the data retrieval request have been sent. If not, control returns to step 354. Otherwise control ends with step 359.

Figure 10:
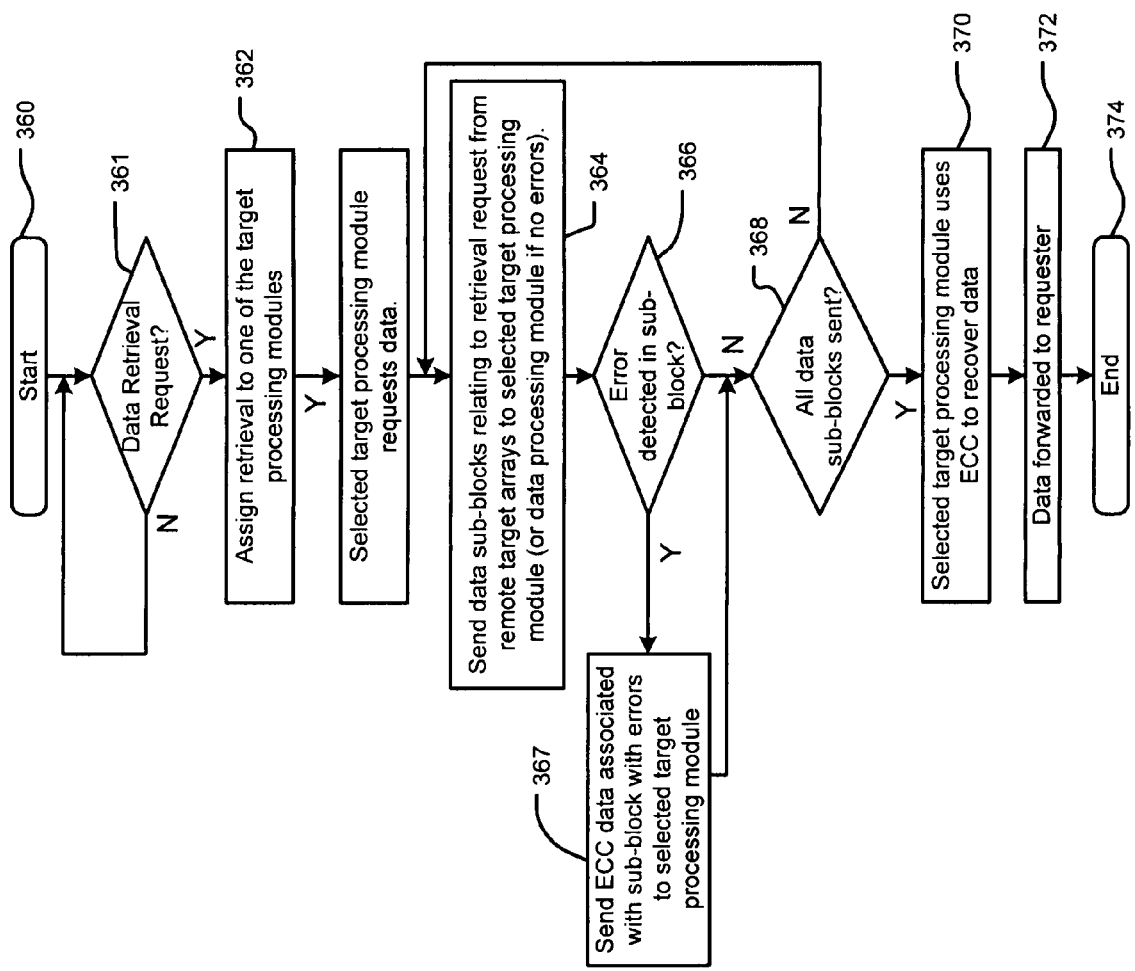
FIG. 10 is a flowchart illustrating an exemplary method for retrieving data blocks with ECC processing performed by a selected one of the target processing modules.

In FIG. 10, a flowchart illustrating an exemplary method for retrieving data blocks with ECC processing is shown. In this implementation, data recovery may be performed by a selected one of the target processing modules. Control begins with step 360 and proceeds to step 361. In step 361, the data processing module determines whether it has received a data retrieval request. If step 361 is true, the data processing module assigns the data retrieval to one of the target processing modules in step 362. The selected target processing module and/or the data processing module requests data from the remote target processing modules.

In step 364, the remote target processing modules send data sub-blocks relating to the retrieval request to the selected target processing module. Likewise, the selected target processing module retrieves data relating to the retrieval request from local drives. Alternately, the remote target processing modules may send the data directly to the data processing module if there are no errors. If there are errors, the remote target processing modules may send the data to the selected target processing module for data recovery.

For each of the remote target processing modules, the remote target processing modules determine whether errors have been detected in one of the data sub-blocks in step 366. If step 366 is true, the remote target processing modules send ECC data associated with the sub-block with errors to the selected target processing module. The data sub-blocks without errors may be sent to the target processing module or the data processing module.

Control continues from steps 366 and 367 with step 368. In step 368, control associated with the remote target processing modules determines whether all of the data sub-blocks have been sent. In step 370, the selected target processing module to uses the ECC data for data recovery, in other words to correct the errors. The selected target processing module forwards the data to the data processing module. The data processing module forwards the recovered data to the requesting device in step 372.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A redundant array of independent disks (RAID) system comprising:
   a network interface;
   N storage arrays, wherein each of the N storage arrays comprises
   a target processing module, and
   M hard disk drives, where M and N are integers greater than 1;
   a data processing module configured to selectively assign error checking and correcting (ECC) processing for data blocks to selected ones of the target processing modules in a non-overlapping manner; and
   a switch module configured to provide communication paths (i) between the data processing module and the N storage arrays and (ii) between each one of the N storage arrays and others of the N storage arrays,
   wherein the data processing module and the switch module are connected between the N storage arrays and the network interface, and
   wherein the N storage arrays communicate with the network interface via the data processing module and the switch module.

2. The RAID system of claim 1, wherein:
   the data processing module is configured to assign a data storage request for a first data block to one of the target processing modules for processing of ECC data for the first data block; and
   the one of the target processing modules are configured to send a portion of the first data block and ECC data associated with the first data block to another of the target processing modules.

3. The RAID system of claim 2, wherein the ECC data received by the another of the target processing modules corresponds to the portion.

4. The RAID system of claim 1, wherein the network interface is configured to receive the data blocks and forward the data blocks to the data processing module,
   wherein the network interface comprises at least one of a network interface, a Gigabit Ethernet network interface or a data bus.

5. The RAID system of claim 1, wherein the switch module comprises a multi-port high speed switch.

6. The RAID system of claim 1, wherein the switch module includes a multi-port switch that operates at speeds greater than or equal to 1 Gigabit per second.

7. The RAID system of claim 1, wherein the switch module includes a multi-port Gigabit Ethernet switch.

8. The RAID system of claim 2, wherein:
   the data processing module is configured to assign a second data storage request for a second data block to a second target processing module for processing of ECC data for the second data block; and
   the second target processing module is configured to send a portion of the second data block and ECC data associated with the second data block to a third one of the target processing modules.

9. The RAID system of claim 8, wherein:
   the one of the target processing modules processes the first data block; and
   the second target processing module processes the second data block; and
   the one of the target processing modules and the second target processing module process the first data block and the second data block in an overlapping manner.

10. The RAID system of claim 2, wherein:
    the data processing module comprises an interface, memory, and at least one processor; and
    the data processing module is configured to perform file system (FS) protocol functions on the first data block.

11. The RAID system of claim 10, wherein the FS protocol comprises at least one of a Network File Server (NFS) protocol or a Common Internet File Server (CIFS) protocol.

12. The RAID system of claim 1, wherein the data processing module is configured to determine a level of RAID storage to be applied to the data blocks.

13. The RAID system of claim 1, wherein the data processing module is configured to (i) map the data blocks to selected ones of the N storage arrays and (ii) update a storage map for the N storage arrays.

14. The RAID system of claim 1, wherein:
the data processing module is configured to assign a data retrieval request to a first one of the target processing modules when the data processing module receives the data retrieval request;
the first one of the target processing modules is configured to request (i) data corresponding to the data retrieval request from others of the target processing modules and (ii) ECC data relating to portions of the data having errors; and
the first one of the target processing modules is configured to perform data recovery on the portions of the data having errors using the ECC data.

15. The RAID system of claim 1, wherein the data processing module is configured to send data retrieval messages to the target processing modules having data corresponding to a data retrieval request when the data processing module receives the data retrieval request.

16. The RAID system of claim 15, wherein the target processing modules are configured to retrieve the (i) data corresponding to the data retrieval request and (ii) ECC data relating to portions of the data having errors.

17. The RAID system of claim 16, wherein:
the target processing modules are configured to send the retrieved data corresponding to the data retrieval request and the ECC data to the data processing module; and
the data processing module is configured to perform data recovery on the portions of the data having errors using the ECC data.

18. The RAID system of claim 16, wherein the target processing modules are configured to perform data recovery on the portions of the data having errors using the ECC data.

19. The RAID system of claim 1, wherein the data processing module:
assigns a data storage request for one of the data blocks to one of the target processing modules for processing of ECC data for the one of the data blocks; and
receives the one of the data blocks from a host device via an Internet.

20. The RAID system of claim 1, wherein the network interface is connected between a host device and the data processing module,
wherein:
the network interface is configured to receive one of the data blocks from the host device; and
the data processing module is configured to assign a data storage request for the one of the data blocks to one of the target processing modules for processing of ECC data for the one of the data blocks.

21. The RAID system of claim 1, wherein the data processing module is configured to (i) process one of the data blocks using at least one of an operating system protocol function or a file system protocol function and (ii) assign RAID redundancy and recovery processing for the one of the data blocks to a selected one of the target processing modules.

22. The RAID system of claim 1, wherein the data processing module is configured to (i) maintain a map of data blocks stored in the N storage arrays and (ii) share the map with the target processing modules.

23. The RAID system of claim 1, wherein the data processing module is configured to:
select one of the target processing modules of the N storage arrays; and
assign RAID redundancy and recovery processing to the selected one of the target processing modules.

24. The RAID system of claim 1, wherein the data processing module is configured to:
assign a data storage request for one of the data blocks to one of the target processing modules for processing of ECC data for one of the data blocks; and
perform error correction code processing to recover the one of the data blocks after storage in the N storage arrays.

25. The RAID system of claim 12, wherein the level of RAID storage identifies whether the RAID system performs striping, disk mirroring, or parity storage.

26. The RAID system of claim 12, wherein the data processing module is configured to:
assign a first data storage request for one of the data blocks to one of the target processing modules for processing of error checking and correcting data; and
receive the one of the data blocks from a host device that is distinct from the RAID system.

27. The RAID system of claim 1, wherein the data processing module is connected between the switch module and the network interface.

28. The RAID system of claim 1, wherein:
the data processing module is configured to (i) assign the ECC processing for the data blocks to the selected ones of the target processing modules while assigning RAID redundancy and recovery processing for other data blocks to other ones of the target processing modules and (ii) does not perform ECC processing; and
the selected ones of the target processing modules are configured to generate ECC data while performing the ECC processing for the data blocks.

29. The RAID system of claim 1, wherein:
the data processing module is configured to generate a data retrieval request; and
one of the target processing modules is configured to (i) retrieve and send data corresponding to the retrieval request to the data processing module (ii) determine whether there is an error in a sub-block of the data corresponding to the retrieval request and (iii) send ECC data to the data processing module when there is an error in a sub-block of the data.

30. The RAID system of claim 1, wherein the data processing module is configured to (i) determine whether data received from the target processing modules has an error and (ii) recover data when the data from the target processing modules has an error based on ECC data from the target processing modules.

31. A redundant array of independent disks (RAID) system comprising:
network interface means for communicating with a network;
N storage means for storing data, wherein each of the N storage means comprises
target processing means for processing, and
M hard disk drives, where M and N are integers greater than 1;
data processing means for selectively assigning error checking and correcting (ECC) processing for data blocks to selected ones of the target processing means in a non-overlapping manner; and
switching means for providing communication paths (i) between the data processing means and the N storage means and (ii) between each one of the N storage means and others of the N storage means,
wherein the data processing means and the switching means are connected between the N storage means and the network interface means, and
the N storage means communicate with the network interface means via the data processing means and the switching means.

32. The RAID system of claim 31, wherein:
the data processing means assigns a data storage request for a first data block to one of the target processing means for processing of ECC data for the first data block; and
the one of the target processing means sends a portion of the first data block and ECC data associated with the first data block to another of the target processing means.

33. The RAID system of claim 32, wherein the ECC data received by the another of the target processing means corresponds to the portion.

34. The RAID system of claim 31, wherein:
the network interface means receives the data blocks and forwards the data blocks to the data processing means; and
the network interface means comprises at least one of a network interface, a Gigabit Ethernet network interface or a data bus.

35. The RAID system of claim 31, wherein the switching means comprises a multi-port high speed switch.

36. The RAID system of claim 31, wherein the switching means includes a multi-port switch that operates at speeds greater than or equal to 1 Gigabit per second.

37. The RAID system of claim 31, wherein the switching means includes a multi-port Gigabit Ethernet switch.

38. The RAID system of claim 32, wherein:
the data processing means assigns a second data storage request for a second data block to second target processing means for processing of ECC data for the second data block; and
the second target processing means sends a portion of the second data block and ECC data associated with the second data block to a third one of the target processing means.

39. The RAID system of claim 38, wherein:
the one of the target processing means processes the first data block;
the second target processing means processes the second data block; and
the one of the target processing means and the second target processing means process the first data block and the second data block in an overlapping manner.

40. The RAID system of claim 32, wherein:
the data processing means comprises an interface, memory, and at least one processor; and
the data processing means performs file system (FS) protocol functions on the first data block.

41. The RAID system of claim 40, wherein the FS protocol comprises at least one of a Network File Server (NFS) protocol or a Common Internet File Server (CIFS) protocol.

42. The RAID system of claim 31, wherein the data processing means determines a level of RAID storage to be applied to the data blocks.

43. The RAID system of claim 31, wherein the data processing means maps the data blocks to selected ones of the N storage means and updates a storage map for the N storage means.

44. The RAID system of claim 31, wherein:
the data processing means assigns a data retrieval request to a first one of the target processing means when the data processing means receives the data retrieval request,
the first one of the target processing means requests (i) data corresponding to the data retrieval request from others of the target processing means and (ii) ECC data relating to portions of the data having errors, and
the first one of the target processing means performs data recovery on the portions of the data having errors using the ECC data.

45. The RAID system of claim 31, wherein the data processing means sends data retrieval messages to the target processing means having data corresponding to a data retrieval request when the data processing means receives the data retrieval request.

46. The RAID system of claim 45, wherein the target processing means having data corresponding to a data retrieval request retrieves the (i) data corresponding to the data retrieval request and (ii) ECC data relating to portions of the data having errors.

47. The RAID system of claim 46, wherein:
the target processing means having data corresponding to a data retrieval request sends the retrieved data corresponding to the data retrieval request and the ECC data to the data processing means; and
the data processing means performs data recovery on the portions of the data having errors using the ECC data.

48. The RAID system of claim 46, wherein the target processing means perform data recovery on the portions of the data having errors using the ECC data.

* * * * *